United States Patent
Netzer et al.

(10) Patent No.: US 11,711,011 B2
(45) Date of Patent: Jul. 25, 2023

(54) SWITCHED POWER CONVERTER SYSTEM

(71) Applicant: Tridonic GmbH & Co KG, Dornbirn (AT)

(72) Inventors: Harald Netzer, Dornbirn (AT); Ludwig Erasmus De Clercq, Dornbirn (AT); Frank Lochmann, Dornbirn (AT)

(73) Assignee: Tridonic GmbH & Co KG, Dornbirn (AT)

( * ) Notice: Subject to any disclaimer, the term of this patent is extended or adjusted under 35 U.S.C. 154(b) by 0 days.

(21) Appl. No.: 17/624,618

(22) PCT Filed: Jul. 15, 2020

(86) PCT No.: PCT/EP2020/070023
§ 371 (c)(1),
(2) Date: Jan. 4, 2022

(87) PCT Pub. No.: WO2021/009243
PCT Pub. Date: Jan. 21, 2021

(65) Prior Publication Data
US 2022/0272812 A1    Aug. 25, 2022

(30) Foreign Application Priority Data
Jul. 15, 2019   (EP) .................................... 19186235

(51) Int. Cl.
*H05B 45/30*   (2020.01)
*H02M 1/12*    (2006.01)
(Continued)

(52) U.S. Cl.
CPC ........... *H02M 1/12* (2013.01); *H02M 1/4225* (2013.01); *H02M 3/33507* (2013.01);
(Continued)

(58) Field of Classification Search
CPC ........ H05B 45/14; H05B 45/38; H05B 45/39; H05B 45/305; H05B 45/375; H05B 45/385; H05B 45/3725
See application file for complete search history.

(56) References Cited

U.S. PATENT DOCUMENTS 7,313,004 B1 *  12/2007  Yang ................... H02M 3/3376
                                                    363/21.02
8,754,581 B2 *   6/2014  Jin  ......................... H05B 45/46
                                                    315/210
(Continued)

FOREIGN PATENT DOCUMENTS

WO    2010116706    10/2010
WO    2016096887     6/2016

OTHER PUBLICATIONS

PCT/EP2020/070023, International Search Report and Written Opinion; dated Sep. 15, 2020, 6 pages.
(Continued)

*Primary Examiner* — Tung X Le
(74) *Attorney, Agent, or Firm* — Andrus Intellectual Property Law, LLP

(57) ABSTRACT

A switched power converter (102) is arranged for supplying lighting means (108) as a load, having at least one (M40, M41) switch controlled by a control unit (106),
wherein the control unit (106) comprises:
  a feedback controller, such as an ASIC or microcontroller, generating a switch control signal based on a feedback signal (Imeas), such as e.g. the load current (ILED), and
a separate sweep block, supplied with a signal representing a characteristic of the load (LED), such as e.g. the load voltage (VLED), and modulating the switch control signal (tout-ctrl) by a cyclic sweep, wherein the modulated switch control signal (tout-sweep) is provided directly or indirectly to the at least one switch (M40, M41).

9 Claims, 12 Drawing Sheets

(51) Int. Cl.
  *H02M 1/42* (2007.01)
  *H05B 45/385* (2020.01)
  *H05B 45/38* (2020.01)
  *H05B 45/375* (2020.01)
  *H02M 3/335* (2006.01)
(52) U.S. Cl.
  CPC .......... *H05B 45/375* (2020.01); *H05B 45/38* (2020.01); *H05B 45/385* (2020.01)

(56) References Cited

U.S. PATENT DOCUMENTS

| | | | |
|---|---|---|---|
| 8,957,600 B1* | 2/2015 | Levy | H05B 45/385 |
| | | | 315/307 |
| 9,748,844 B2 | 8/2017 | Ramabhadran et al. | |
| 2011/0121754 A1* | 5/2011 | Shteynberg | H05B 45/10 |
| | | | 315/294 |
| 2012/0274136 A1* | 11/2012 | Ge | H02M 3/33523 |
| | | | 307/32 |
| 2013/0070485 A1 | 3/2013 | Li et al. | |
| 2013/0200707 A1* | 8/2013 | Hartmann | H05B 47/18 |
| | | | 307/39 |
| 2014/0375229 A1* | 12/2014 | Gruber | H05B 45/10 |
| | | | 315/291 |
| 2019/0058393 A1* | 2/2019 | Elferich | H02M 3/335 |

OTHER PUBLICATIONS

Diego G. Lamar et al., "On the Limit of the Output Capacitor Reduction in Power-Factor Correctors by Distorting the Line Input Current", IEEE Transactions on Power Electronics, Institute of Electrical and Electronics Engineers, USA, vol. 27, No. 3, Mar. 1, 2012, pp. 1168-1176.

* cited by examiner

SWITCHED POWER CONVERTER SYSTEM

CROSS REFERENCE TO RELATED APPLICATION

The present application is the U.S. national stage application of international application PCT/EP2020/070023 filed Jul. 15, 2020, which international application was published on Jan. 21, 2021 as International Publication WO 2021/009243 A1. The international application claims priority to European Patent Application 19186235.8 filed Jul. 15, 2019.

FIELD OF THE INVENTION

The invention relates to a switched power converter system for operating lighting means.

BACKGROUND OF THE INVENTION

In order to operate, many devices make use of electrical power. Initially, power is supplied by a power source, such as a public utility company, and, usually, power sources provide a steady state input voltage.

However, various devices may utilize voltage levels which may differ from the steady state input voltage provided by the power source. For example, light emitting diodes (LED) and systems based thereon, typically operate from voltage levels that differ from voltage level supplied by a public utility company.

In order to adjust the difference between the voltage from the power source and the voltage utilized by the device, a power converter can be connected between the power source and the device in order to convert a supply voltage level from an alternating current (AC) power source to, for example, another AC power source having a voltage level different than the supply voltage level.

Power converters can also convert AC power into direct (DC) power and DC power into AC power.

Switching power converters represent one example of a type of power converter. A switching power converter utilizes (active) switching and energy storage technology to convert an input voltage into an output voltage suitable for use by a particular device connected to the switching power converter.

Power converters are used in a variety of portable electronic devices, including laptops, mobile devices, cellular phones, and the like. In addition, power converters may be used in non-portable applications, such as liquid-crystal display (LCD) backlighting, automotive lighting, and other general purpose or specialty lighting.

As mentioned above, there are several power converter topologies. Some converters are DC-DC converters, meaning that they convert a direct current (DC) input voltage to a different DC output voltage for a load, wherein the load can be an LED. Moreover, AC-AC converters are designed to convert an alternating current (AC) input voltage to a different AC output voltage. Finally, DC-AC converters are configured to convert a DC input voltage to an AC output voltage, and AC-DC converters convert an AC input voltage to a DC output voltage.

In order to better understand how a power converter operates, in the following, a description of a conventional AC-DC power converter is given.

Conventional AC-DC power converters typically include a diode bridge rectifier stage (i.e., a bridge or full-wave rectifier) and a bulk storage capacitor, the voltage of which may feed an LED load. The incoming AC voltage is generally provided by an AC power supply or AC line, which is converted to a DC output voltage when run through the diode bridge rectifier and bulk storage capacitor. This DC voltage is typically further processed by the converter, which generates an output signal that is applied across a load, such as an LED load.

In this configuration, the rectifying circuit only draws power from the AC line when the instantaneous AC voltage is greater than the voltage across the bulk storage capacitor, resulting in a non-sinusoidal current signal that has high harmonic frequencies.

Therefore, these converters and other non-linear loads change the nature of the current so that it is no longer sinusoidal. Different methods such as filtering or adding control systems to force current flow to follow a reference signal are often used in order to reduce the non-linearity effects.

Since the current in these non-linear systems is still periodic (just not sinusoidal), this change in the nature of the current can be described in terms of the harmonic distortion of the current.

In fact, in an AC power converter system, the voltage or current wave shapes may be expressed as a fundamental and a series of harmonics. These harmonics have some multiple frequency of the fundamental frequency of the line voltage or current. Specifically, the distortion in the AC wave shape has components which are integer multiples of the fundamental frequency. Of particular concern are the harmonics that are multiples of the $3^{rd}$ harmonic. These harmonics add numerically in the neutral conductor of a three-phase power system.

Typically, the total harmonic distortion is calculated using the first 30 harmonics of the fundamental frequency. Total harmonic distortion (THD) of the input current is preferred to be below 33.3% to prevent overheating of the neutral wire in a three-phase power system. Further, many users of lighting systems require ballasts to have an input current total harmonic distortion of less than 20%.

Therefore, one inherent shortcoming of the above described converter configuration is that the AC input current waveform tends to be somewhat distorted (flattened) compared to the desired sinusoidal waveform, increasing the total harmonic distortion (THD) and degrading the power factor, e.g., less than 1.

Furthermore, the so-called LLC converter topology (half bridge and LLC resonant circuit) is used in many devices as a DC/DC voltage or current source and is highly nonlinear. An example of a power converter e.g. LLC power circuit (without sensing components) is shown in FIG. 1.

In FIG. 1, the DC input voltage $V_{BUS}$ (e.g., 400 V supplied from a boost converter that is used for power factor correction, PFC) supplied to the half bridge circuit consisting of switches e.g. FETs $M_{40}$ and $M_{41}$. The rectangular half bridge middle point voltage (rectangle between 0 V and 400 V) is the input voltage to the LLC resonant circuit. The LLC resonant circuit consists of a resonance capacitor $C_{51}$ and a resonance inductance $L_{res}$. Often no external resonance inductance is used but the leakage inductance of the LLC transformer $L_{51}$ is utilized as resonance inductance. Said LLC transformer $L_{51}$ transforms the primary side voltage (whose level depends on the series resonance circuit $C_{51}$ and $L_{res}$ and on the half bridge frequency) to the secondary side according to the turn ratio of the transformer $L_{51}$. The secondary side voltage, induced in secondary side windings $L_{51a}$ and $L_{51b}$, is rectified by rectifying diodes $D_{52a}$ and $D_{52b}$. Finally, the rectified secondary side voltage is filtered/buffered with capacitor $C_{52}$ supplying the LED load.

Instead of the configuration shown in FIG. 1, wherein an LLC transformer with two secondary side windings is utilized, commonly, transformers with only one secondary winding are used as well. In this case, instead of the diodes $D_{52a}$ and $D_{52b}$ a bridge rectifier is used as shown in FIG. 2.

FIG. 3 shows an example of a nonlinear relationship between the half bridge frequency (x axis) and the LLC output voltage (y axis), at a given constant LED current of (here) 0.5 A. From FIG. 3, it can be taken that, if the LLC output voltage is 200 V (to supply a LED module with a corresponding forward voltage), a half bridge frequency of 54.76 kHz is needed in order to deliver 0.5 A flowing through the LEDs. In this area, the negative voltage/frequency gradient is quite high, so in case of 194.7 V, the frequency should be 55.76 kHz. At 120 V, the gradient is low, and a half bridge frequency of 92.24 kHz is necessary, whereas at 118.77 V, and a frequency of 93.24 kHz is necessary.

This means that a variation of the half bridge frequency of 1 kHz at one set point of the frequency of the half bridge leads to about 5 V difference in the LLC output voltage (at constant 0.5 A LED current) and on another point leads to about 1 V difference in the LLC output voltage (at constant 0.5 A LED current).

Usually, when the half bridge frequency is changed, the LED current changes and the voltage is constant (or changes slightly due to the LED characteristic).

In FIG. 4, the relationship between the half bridge frequency (x axis) and the LED current (y axis) is shown, for a constant LLC output voltage of (here) 200 V.

It can be seen that in this example at a half bridge frequency of 54.76 kHz, the LED current is 500.46 mA. If the half bridge frequency is increased by 1 kHz to 55.76 kHz, the current changes to 269.61 mA which is a high delta of about 230 mA. The gradient is quite high in this frequency range. At another working point, with a half bridge frequency of 52.51 kHz, the LED current is about 700.16 mA. Increasing the frequency at this working point by about 1 kHz to 53.51 kHz leads to an LED current of 636.56 mA which means only a delta in the current of about 63 mA. It should be noted that the gradient is quite low in this frequency range.

Further examples are provided in FIG. 5 for a fixed LED current of 0.1 A and in FIG. 6 for a fixed LLC output voltage (LED voltage) of 120 V.

In FIG. 5, it can be seen that the voltage is 200.05 V at 56.04 kHz and 194.11 V at 57.04 kHz, and the gradient is high at this point. At 112.8 kHz, the voltage is 120 V, and at 113.8 kHz it is 119.71 V, and the gradient is high at this point.

In FIG. 6, it can be seen that the current is 500.14 mA at 92.24 kHz, and 467.96 mA at 93.24 kHz, and the gradient is low at this point. At 87.46 kHz, the current is 700.02 mA, and, at 88.46 kHz, it is 650.32 mA, the gradient is higher at this point.

Summarizing, as it can be taken from the description of FIGS. 3 to 6, there is a nonlinear relationship between the half bridge frequency and the output current/voltage of they switched converter. Therefore, a change in the half bridge frequency (of e.g., 1 kHz) leads to different changes in the output current/voltage depending on the working point.

This behavior leads to problems in the controller design (e.g., a PI controller is used that feedback-controls the LED current by setting the half bridge frequency), in the design of sweep modes (added sweep of the half bridge frequency to improve electromagnetic interference, EMI, and the light flicker), or in the design of feed forward functionality (to feed forward compensate a ripple on the DC supply voltage $V_{BUS}$).

The inventors have noticed that for the three mentioned blocks/features (controller, sweep mode, and feed forward), a linear relationship between the half bridge frequency and the output quantity (either LED current in a constant current gears, or the converter output (LED) voltage in a constant voltage gears) would be desired.

When the half bridge frequency is swept around the target frequency (which is determined by the controller) by e.g. +/−1 kHz, different output current amplitudes at different working points are generated. In some cases, in regions where a delta in the half bridge frequency leads to a large change in output current, a certain sweep setting can lead to too high output current ripples. However, in another frequency region, where a delta in the half bridge frequency leads to a small change in output current, the same sweep settings could be acceptable, because the generated ripple on the output current is below the acceptable limit.

The same issues occur for the controller. At given controller characteristics (fixed settings of e.g. proportional gain, integration time and update rate of PI controller) a certain controller set point is reached faster or slower due to the nonlinear plant. This leads for example to differences in the duration of the true light output reaching the nominal value of dim curves.

Thus, in view of the above-mentioned disadvantages of conventional converters, there is a need for an improved switched power converter in which the total harmonic distortion is reduced.

In addition or alternatively, the inventors have found that there is a need for an improved response of the feedback loop.

SUMMARY OF THE INVENTION

The object of the present invention is achieved by the solution provided in the enclosed independent claims. Advantageous implementations of the present invention are further defined in the dependent claims.

A first aspect of the invention relates to a switched power converter system arranged for supplying lighting means as a load, the system comprising:
- a power converter with at least one switch controlled by a control unit of the power converter, wherein the control unit comprises a feedback controller, such as an ASIC or microcontroller, generating a switch control signal based on a feedback signal (Imeas), such as e.g. the load current (ILED), and
- a separate sweep block supplied with a signal representing a characteristic of the load (LED), such as e.g. the load voltage (VLED), and modulating the switch control signal (tout-ctrl) by a cyclic sweep, wherein the modulated switch control signal (tout-sweep) is provided directly or indirectly to the at least one switch (M40, M41).

In a further embodiment, the switched power converter is a PFC circuit or a half-bridge LLC or LCC converter or any other DC/DC or AC/DC switched power converter.

BRIEF DESCRIPTION OF THE DRAWINGS

The invention will be explained in the following together with the figures.

DETAILED DESCRIPTION

Figure 1:
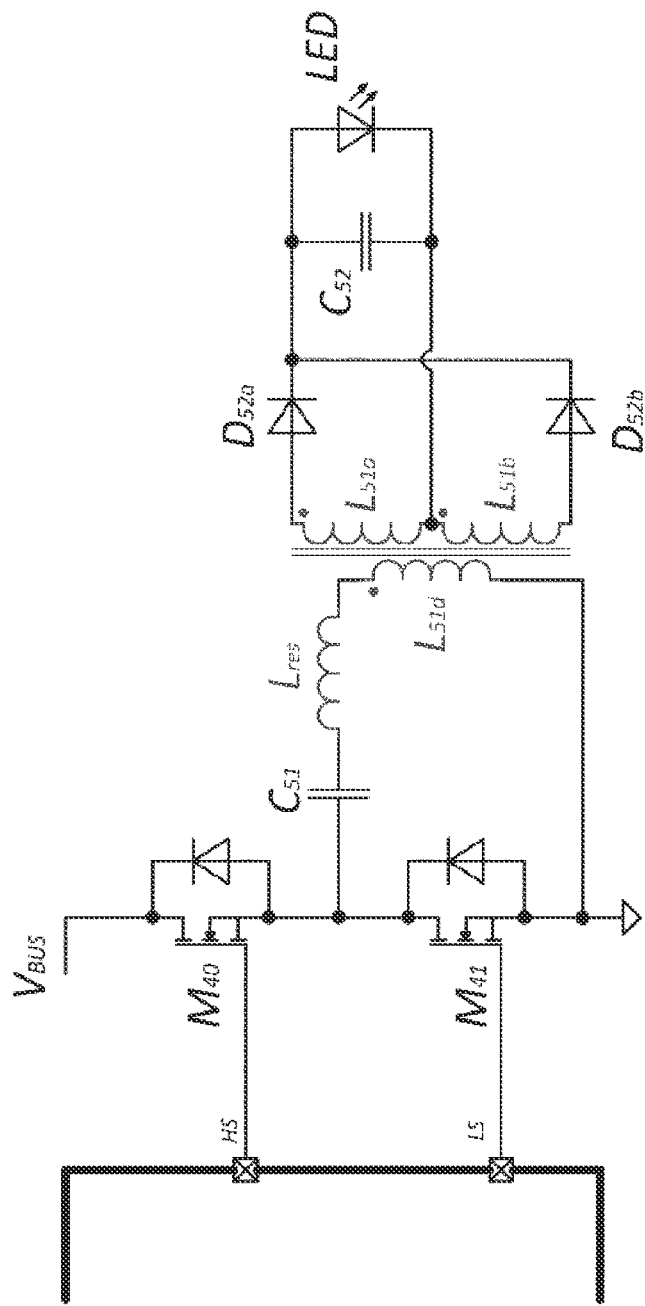
FIG. 1 shows an LLC power circuitry according to prior art.
Figure 2:
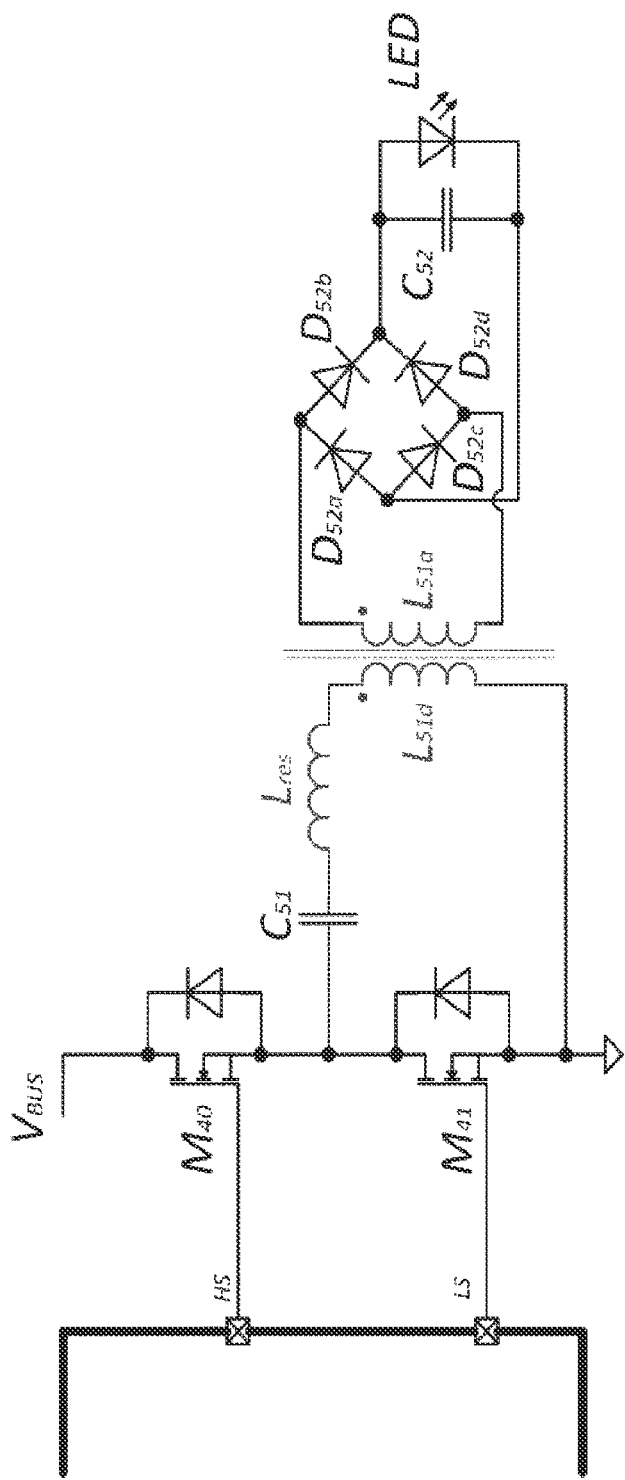
FIG. 2 shows an LLC power circuitry with a bridge rectifier according to prior art.

Aspects of the present invention are described herein in the context of a switched power converter.

The present invention is described more fully hereinafter with reference to the accompanying drawings, in which various aspects of the present invention are shown. This invention however may be embodied in many different forms and should not be construed as limited to the various aspects of the present invention presented through this disclosure. Rather, these aspects are provided so that this disclosure will be thorough and complete, and will fully convey the scope of the present invention to those skilled in the art. The various aspects of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus.

Various aspects of a switched power converter will be presented. However, as those skilled in the art will readily appreciate, these aspects may be extended to aspects of switched power converters without departing from the invention.

It is further understood that the aspect of the present invention might contain integrated circuits that are readily manufacturable using conventional semiconductor technologies, such as complementary metal-oxide semiconductor technology, short "CMOS". In addition, the aspects of the present invention may be implemented with other manufacturing processes for making optical as well as electrical devices. Reference will now be made in detail to implementations of the exemplary aspects as illustrated in the accompanying drawings. The same references signs will be used throughout the drawings and the following detailed descriptions to refer to the same or like parts.

Figure 7:
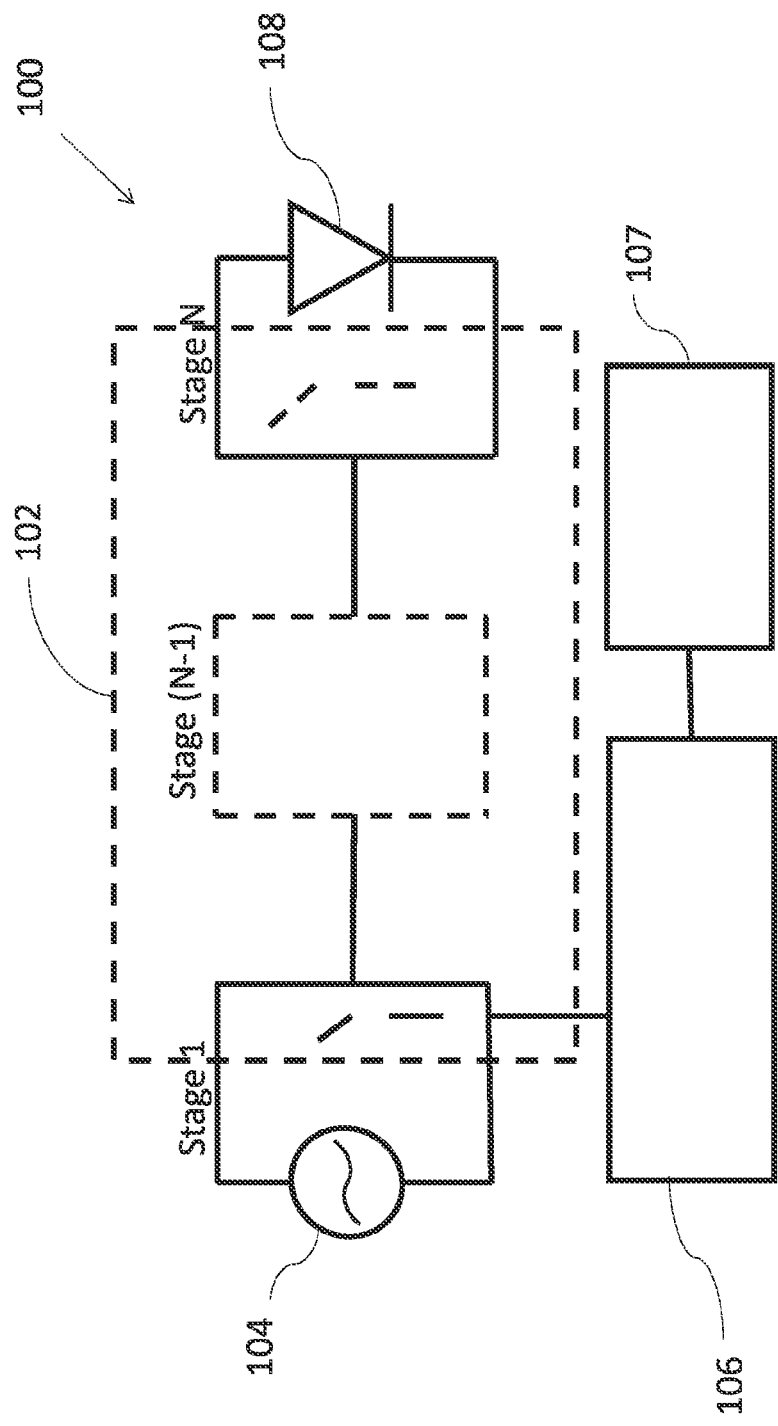
FIG. 7 shows a system comprising a switched power converter system for lighting means according to an embodiment of the invention, as well as LED lighting means 108.

FIG. 7 shows a system 100 comprising a switched power converter system 102 as well as lighting means 108. The switched power converter system 102 has at least one switch controlled by a control unit 106. The switch frequency is on the result of a feedback control e.g. of the output voltage or the LED load current of the converter. The result of the feedback control is then modulated by a sweep pattern. The sweep pattern thus is not the result of a feedback control itself.

The sweep pattern preferably is load-adaptive.

"Load adaptive" is to be understood such that the control unit 106 senses directly or indirectly a load characteristic and
  calculates and then uses such pattern depending on the actual load characteristics, and/or
  accesses a storage means in which pre-computed patterns for different load characteristics are stored.

The switched power converter system 102 can have one or more stages (stage 1 to stage N in FIG. 1). This means that the switch frequency of any of these stages, e.g. of the first stage (stage 1), may be modulated indirectly in an adaptive way when a potential change occurs.

The pattern for at least one sine half wave of a supplying AC mains voltage 104 is defined, e.g. by using a neural network, prior to the application thereof during at least one sine half wave. To this regard, the control unit 106 may access a memory unit 107 in which the pattern is stored. This is in contrast to the frequency variation occurring caused by a feedback control of an output parameter of the converter, which is not pre-defined.

The re-definition of the pattern, or the use of another pattern may be event-triggered, i.e. upon the control unit detecting a changed in a characteristic of the LED load.

Figure 8:
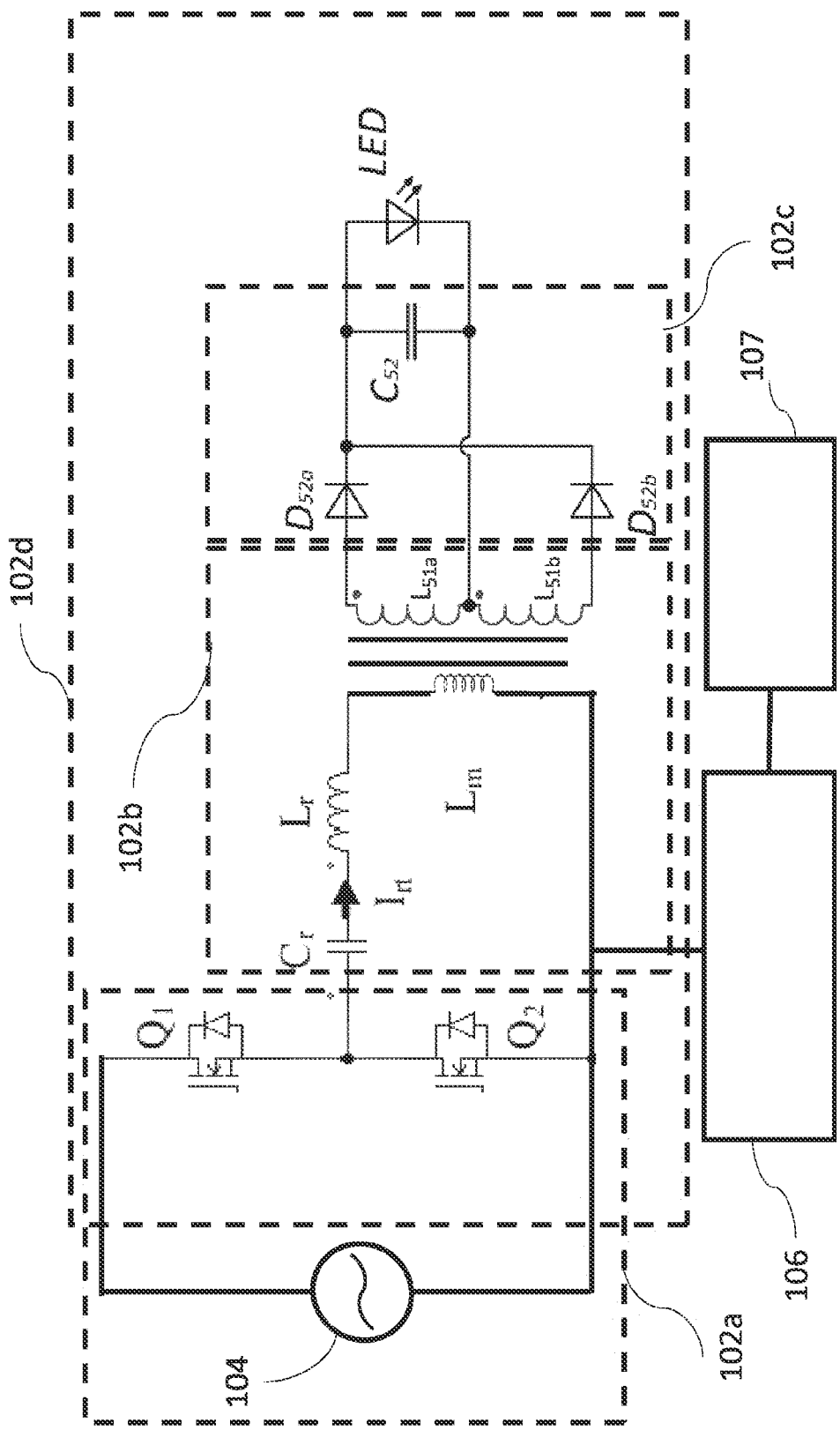
FIG. 8 shows a switched power converter for lighting means.

FIG. 8 shows a switched power converter 102d for lighting means LED according to an embodiment.

In this embodiment, the switched power converter 102d is an LLC converter comprising a switching network 102a, a resonant tank 102b and a rectifier 102c.

The switching network 102a can comprise two switches Q1 and Q2 controlled by the control unit 106. The switch frequency from a feedback control can be modulated thereafter with a pattern that can be load adaptive such that the control unit 106 can apply such pattern depending on load characteristics.

The resonant tank 102b can comprise a capacitor Cr, and three inductances Lr, Lm, $L_{51a}$, and $L_{51b}$. The rectifier 102c can comprise the diodes $D_{52a}$ and $D_{52b}$ as well as the smoothing capacitor $C_{52}$.

In this example, the control unit 106 can be configured to use the frequency values of the pattern as input in order to modulate the switching frequency or switching period by a cyclic sweep pattern. However, the invention also proposes power converter systems (see FIGS. 10 and 11) in which the control unit 106 determines a switching period or frequency by applying a feedback control algorithm, and the result of the feedback control algorithm is then supplied to a separate sweep unit applying such sweep pattern.

The sweep pattern can be determined offline, e.g. by using Artificial intelligence such as e.g. a neural network establishing an optimized feed forward pattern for a given application scenario, such as e.g. the given mains supply (mains frequency, mains voltage level) and the given converter operating point (LED voltage, LED current). The optimization criterion can be e.g. that the LF ripple of the LED output current is minimized (if the feed forward pattern is applied to the HB-LLC converter, or in general to the stage which is the LED current source). An alternative or additional optimization criterion can be to minimize the THD of the converter input current—in this case the pattern would be applied to the boost converter (first stage).

As will be explained later on with reference to FIG. 12, the sweep pattern can be produced in an optimized manner by a computing unit outside the switched power converter system, such as e.g. a server of a lighting system.

Figure 10:
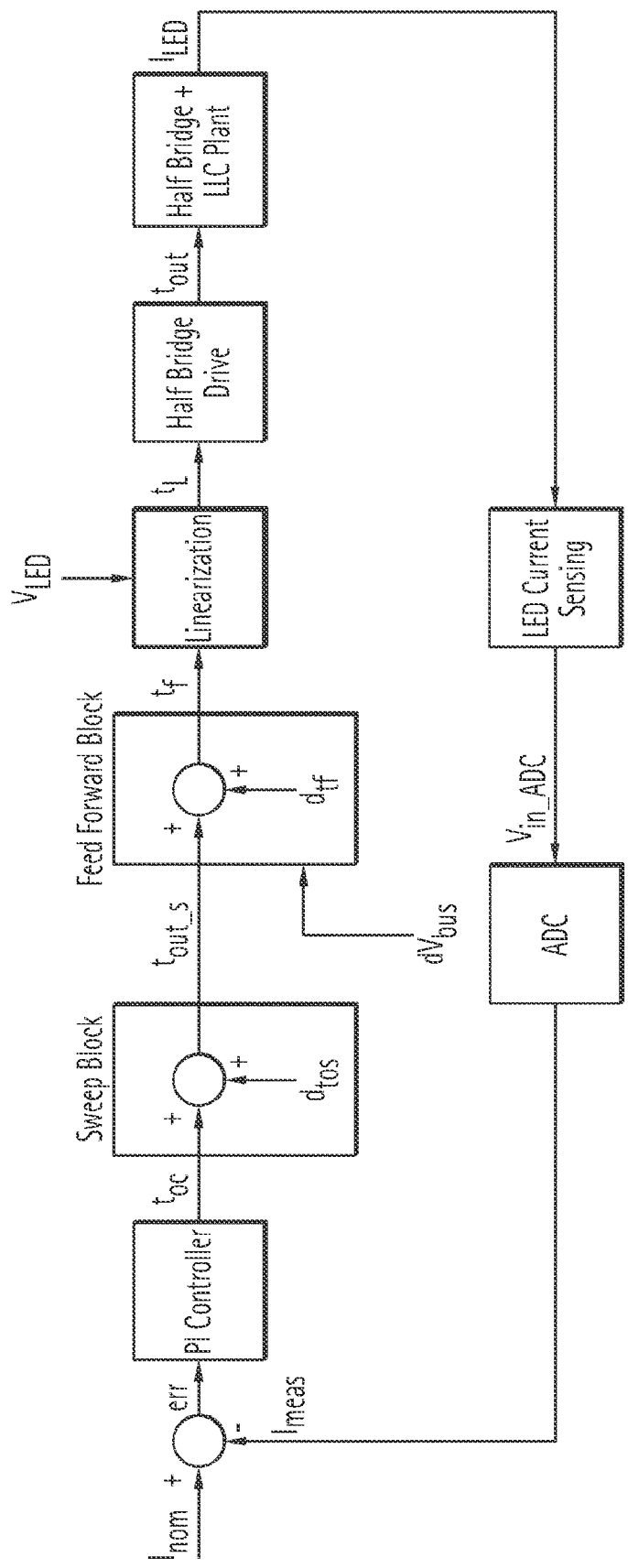
FIG. 10 shows a switched power converter system according to the invention, having an LLC control loop for an LED current control with a plant linearization module.
Figure 11:
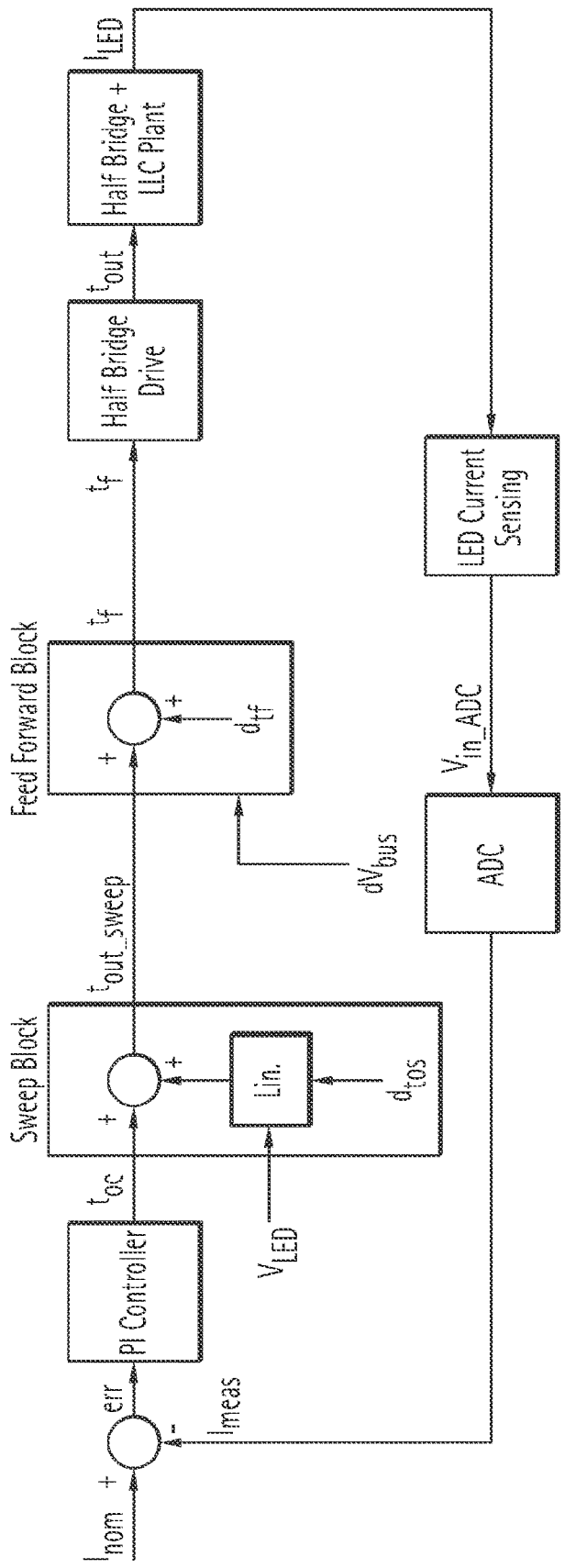
FIG. 11 shows a switched power converter system according to the invention, having an LLC control loop for an LED current control with a linearized sweep mode.

Thus, different pattern for different load voltage dependent application scenarios can be produced offline and then stored in the memory unit 107 to be accessed by the control unit 106 in the present embodiment (or by a dedicated sweep block in the embodiments of FIGS. 10 and 11).

Figure 9:
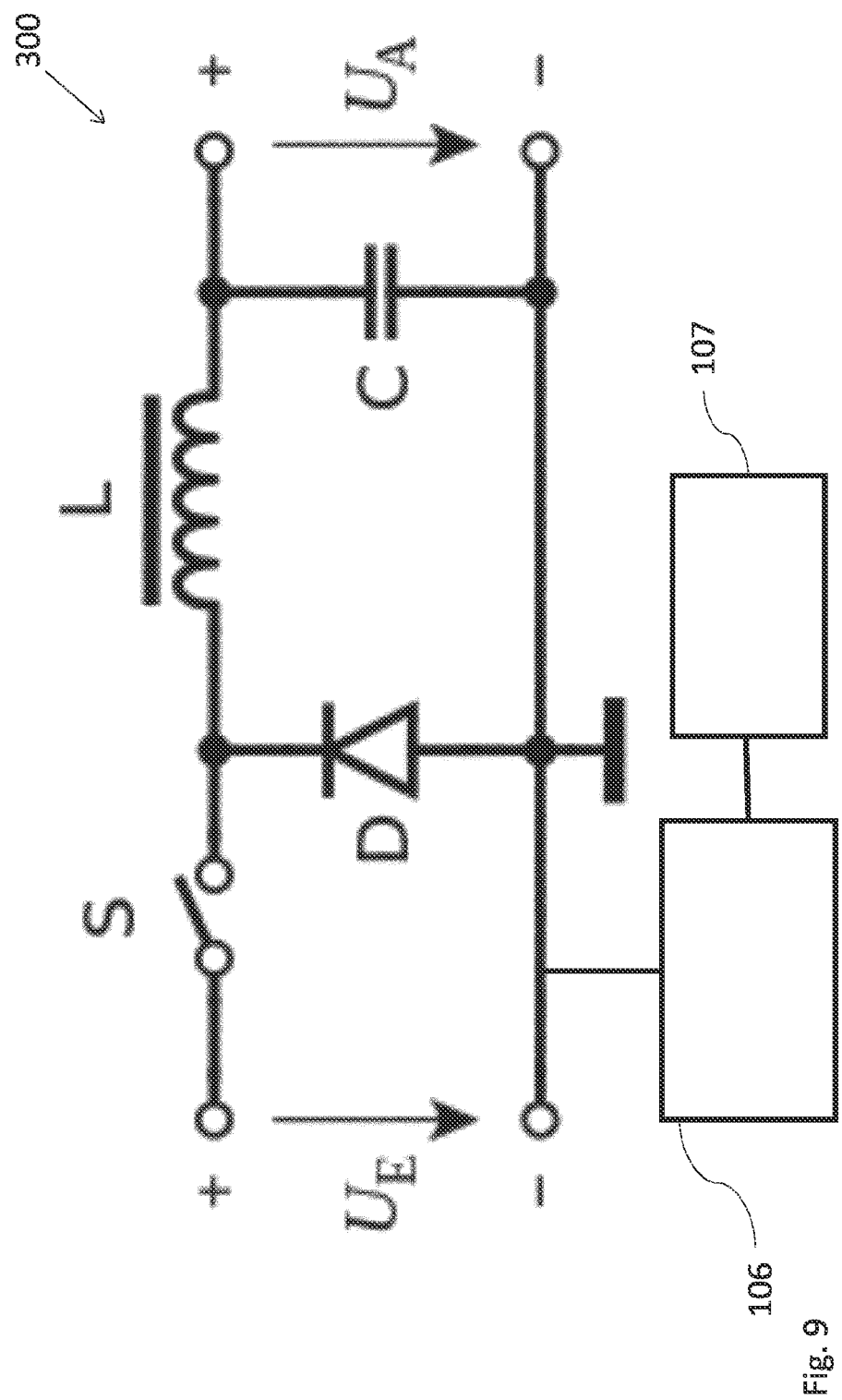
FIG. 9 shows a buck converter according to an embodiment of the invention.

FIG. 9 shows a buck converter 300 according to an embodiment. In this embodiment the buck converter 300 comprises a switch S, for example a MOSFET, an inductance L, a diode D and a capacitor C.

The buck converter 300 can be a DC/DC converter mostly used for constant LED current control. The output voltage is controlled by the MOSFET's switching frequency and its duty cycle (the on and off times of switch S).

FIG. 10 shows a switched power converter system according to the invention having a control loop for an LED current control with a plant linearization module according to an embodiment of the invention.

In FIG. 10, a set-point for the output current ILED is given as $I_{nom}$ (digital value). It is compared to the digitalized measurement feedback value of the output current $I_{meas}$. The output current error err is fed to a e.g. PI controller block which outputs a set-point for the half bridge period $t_{oc}$ (or frequency) LLC. This value is fed to a sweep block applying a modulation (sweep) pattern as explained above, by adding a sweep period $d_{tos}$, resulting in a time period $t_{out\_s}$, which is fed to an optional Feed Forward Block which, depending on a supplied current value of the bus supply voltage dVbus, adds a time period value dtf, resulting in a time period value $t_f$. This value is given to a linearization module, which is supplied with a load characteristic such as e.g. the load (LED) voltage VLED.

Figure 4:
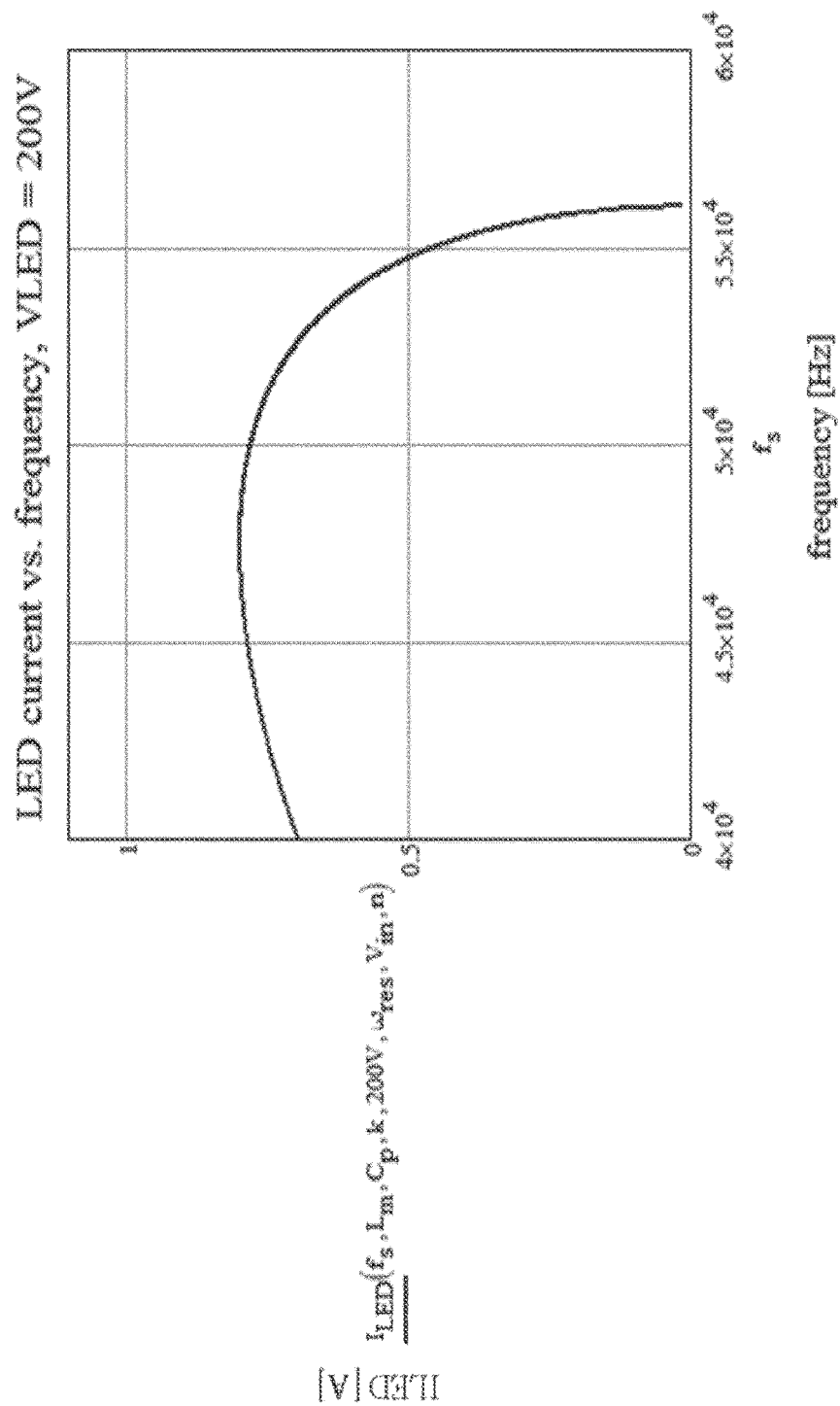
FIG. 4 shows an exemplary relationship between a half bridge frequency and an LLC output current, at a fixed LED voltage of 200 V, according to prior art.
Figure 5:
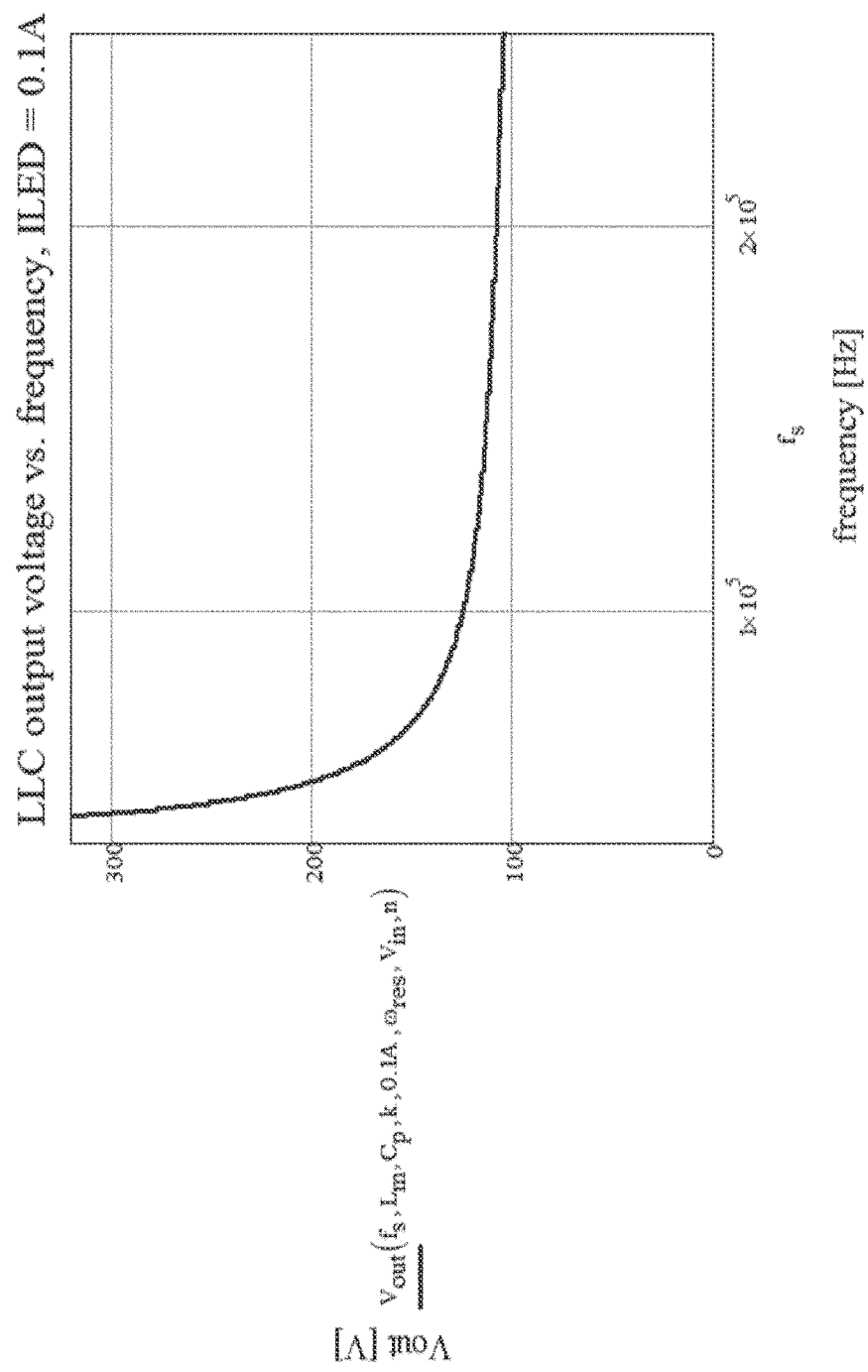
FIG. 5 shows an exemplary relationship between a half bridge frequency and an LLC output voltage, at a fixed LED current of 0.1 A.
Figure 6:
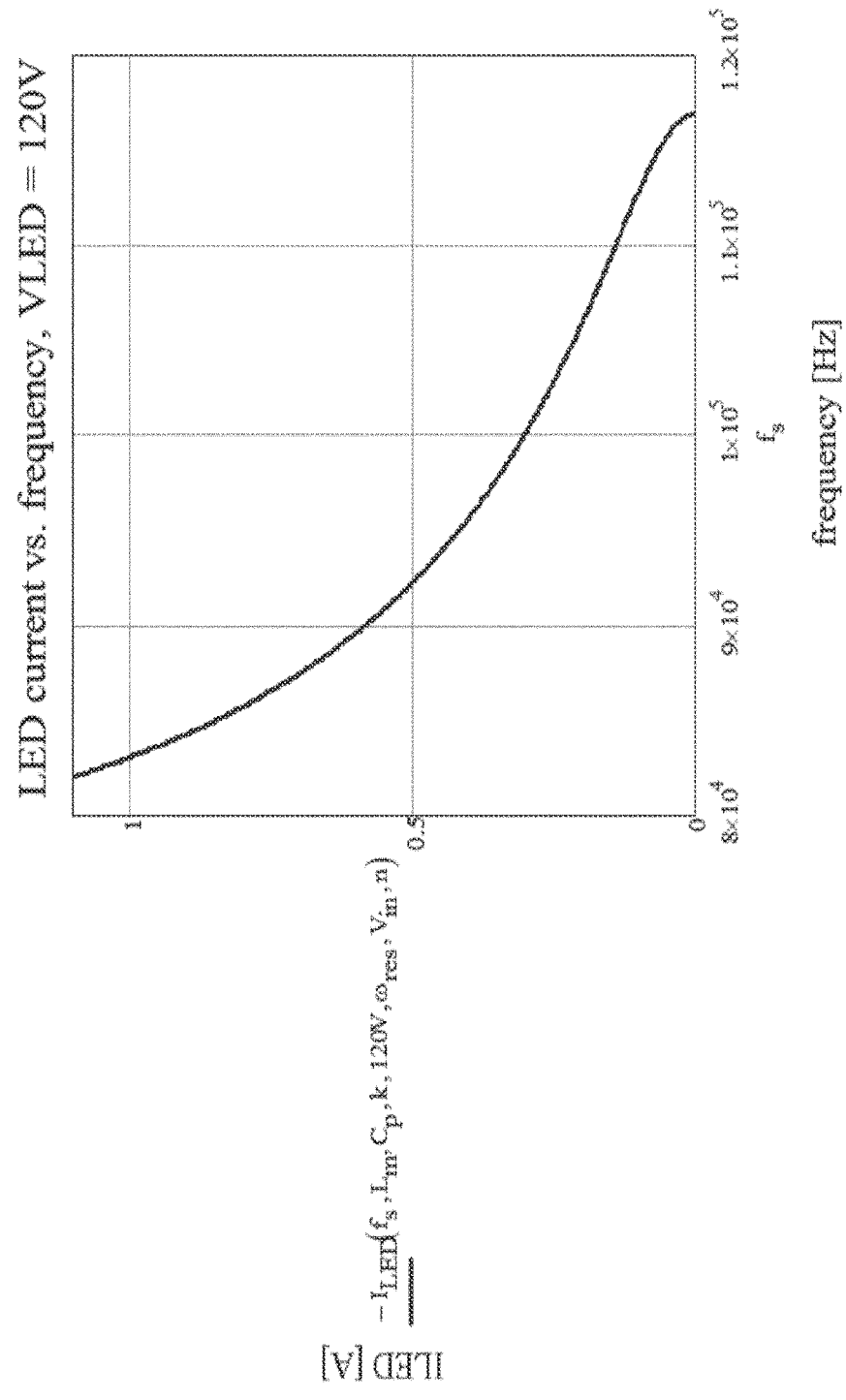
FIG. 6 shows an exemplary relationship between a half bridge frequency and an LLC output current, at a fixed LED voltage of 120 V, according to prior art.

The linearization module compensates at least partially the nonlinear LED current/frequency curve as shown e.g. in FIG. 4 by applying a linearization factor according to an inverted linearization curve of the curve of FIG. 4.

As one option, the nonlinear LED current/frequency curve can be measured offline, then inverted to obtain the linearization curve, which can be stored as a look-up table or function to be accessed by the linearization module. The linearization curve gives a load voltage dependent linearization factor. The linearization factor increases supplied values in load voltage areas where the gradient of the voltage/frequency curve is low, compared the linearization factor in load voltage areas where the gradient is high.

Thus, the linearization factor of the linearization module changes with different LED voltages $V_{LED}$. In this embodiment, the linearization block is shown as a multiplication (scaling) of $t_f$, but it can also be that an addition/subtraction is used. In this case, a delta linearization is added to $t_f$ in order to obtain $t_l$.

As another option for obtaining a linearization factor, the estimation of the plant characteristic (voltage/frequency or current/frequency curve) can be done whenever a steady state working point is reached during operation of the lighting means (so, once a transient dimming phase is finished). If the converter feedback controls the output current and e.g. dims from 10 mA to 100 mA, once 100 mA is reached (measured by the current sensing path), the half bridge period is monitored. For example, $t_l$ is 110 kHz. In order to estimate the characteristic (the slope) locally at this working point, for a short amount of time (e.g., 20 ms) the half bridge period (frequency) is increased (or decreased) by a small delta and the new output current is measured. Then, the half bridge frequency and output current of two points are known and the gradient ($I_{LED}$ vs. $f_{hb}$) can be calculated. In order for the mentioned estimation to work, the control loop should be stopped for the mentioned amount of time and the half bridge period should be fixed to the defined value.

In general, the approach when steady state is reached is as follows:

$1^{st}$ step: freeze the current half bridge frequency $f_1$;

$2^{nd}$ step: wait for a predetermined amount of time, e.g., 20 ms;

$3^{rd}$ step: measure the LED current $I_{LED1}$;

$4^{th}$ step: increase/decrease the frozen (constant) half bridge frequency by a small delta to $f_2$;

$5^{th}$ step: wait for a predetermined amount of time, e.g., 20 ms;

$6^{th}$ step: measure the LED current $I_{LED2}$;

$7^{th}$ step: calculate the gradient of the plant characteristic ($k=(I_{LED2}-I_{LED1})/(f_2-f_1)$);

$8^{th}$ step: set the parametrization of the linearization block according to the calculated gradient in the $7^{th}$ step; and $9^{th}$ step: continue the normal operation (unfreeze half bridge frequency and continue running the control loop).

Figure 3:
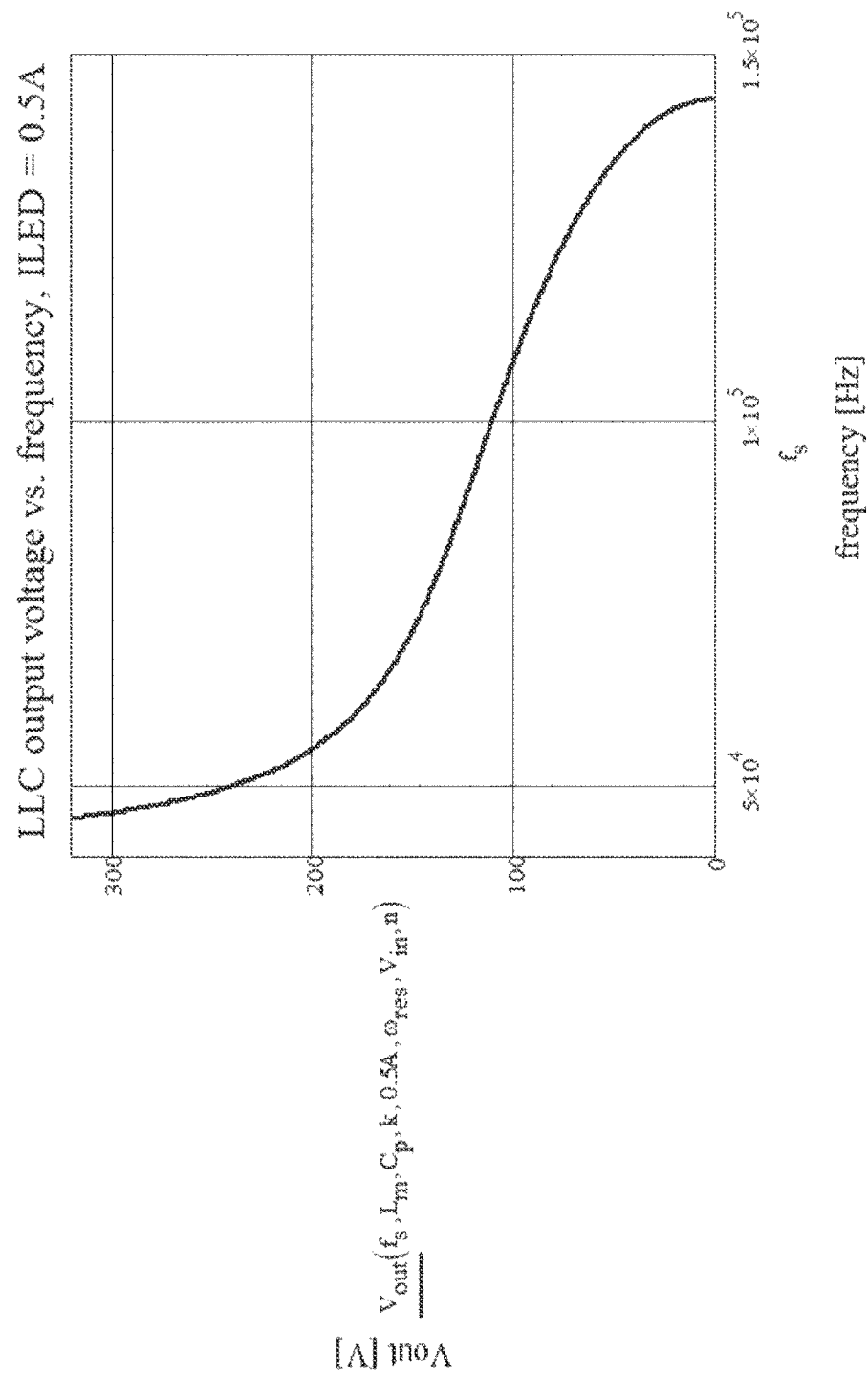
FIG. 3 shows an exemplary relationship between a half bridge frequency and an LLC output voltage, at a fixed (feedback-controlled) LED current of 0.5 A, according to prior art.

Therefore, the linearization of the plant can be done by a nonlinear scaling of the half bridge frequency (determined by the controller block, the sweep mode block and the feed forward block) before the half bridge frequency is actually set at the output (half bridge driver block). According to an embodiment, such a linearization is applied and its parameters are determined online (so, not during development but when the gear is switched on). The relationships shown in FIG. 3, as described above, depend on several factors such as level of the input voltage $V_{BUS}$, tolerances of the involved circuit components, forward voltage of the connected LED module or ambient temperature. Therefore, they can change during the operation time of the gear and may not be set during development/production of the gear.

Thus, the LLC converter is based on a feedback control of the directly or indirectly sensed LED current and a feedback controller adjusts the frequency of the half bridge drive, such that the measured LED current is controlled to a nominal value $I_{nom}$.

FIG. 11 shows an LLC control loop for an LED current control with a linearized sweep mode according to an embodiment.

The linearization can either be applied as shown in FIG. 10 to the whole control loop or only to single modules such as to the sweep block as shown in FIG. 11. It can also be applied to the feed forward block.

In this embodiment, only the effect of the sweep block is linearized.

The sweep mode can e.g. always sweeps the half bridge frequency by +/−100 Hz which, depending on the LED voltage leads to e.g. +/−10 mA at one LED voltage and +/−50 mA at another (which is not desired, as it should result in the same change in LED current). However, in embodiments of the present invention, the linearization of the sweep block leads to different sweep frequencies (e.g., +/−100 Hz at one LED voltage, +/−20 Hz at another) but to equal LED current changes regardless of the LED voltage. The signal $dt_{os}$ within the sweep block, shown in FIG. 10, is a small delta which is either positive or negative (triangular waveform) and is added to the half bridge period determined by the controller $t_{oc}$. Advantageously, the output value $dt_{os}$ is scaled depending on the estimated plant characteristic.

Summarizing, in view of the description of FIG. 10 and FIG. 11 in order to reach the desired LED current, the controller does issue a center frequency or center period of the switching of the half bridge drive switches, which is fed to the sweep block. In order to improve the electromagnetic interference (EMI) spectrum the sweep block modulates the center frequency or center period value issued by the controller with a for example cyclic up and down sweep. This swept value may be optionally supplied to the block feed forward, which makes a feed forward adjustment of the output of the controller depending on a sensed value of the DC bus voltage supplying the LLC converter.

Now, as explained above, in view of the highly nonlinear dependency of the LED current or output voltage of the LLC vs. the frequency of the LLC drive, the modulations of the center frequency performed by the block-sweep or feed forward block can have widely varying impact on the resulting LED current.

At certain frequencies (see FIGS. 3 and 4) a given modulation of the center frequency can lead to unwanted high fluctuations in the LED-current and, thus, in the light output of the LED load.

In order to overcome this drawback, the output of the block-sweep and/or feed forward can be calibrated by the linearization block.

The linearization block essentially calibrates the modulation amplitude added by the blocks sweep or feed forward depending on the current set point of the frequency. Thus, the compensation of the modulation value is performed depending on the output current/frequency or output voltage/frequency slope of the current set point of the frequency.

Figure 12:
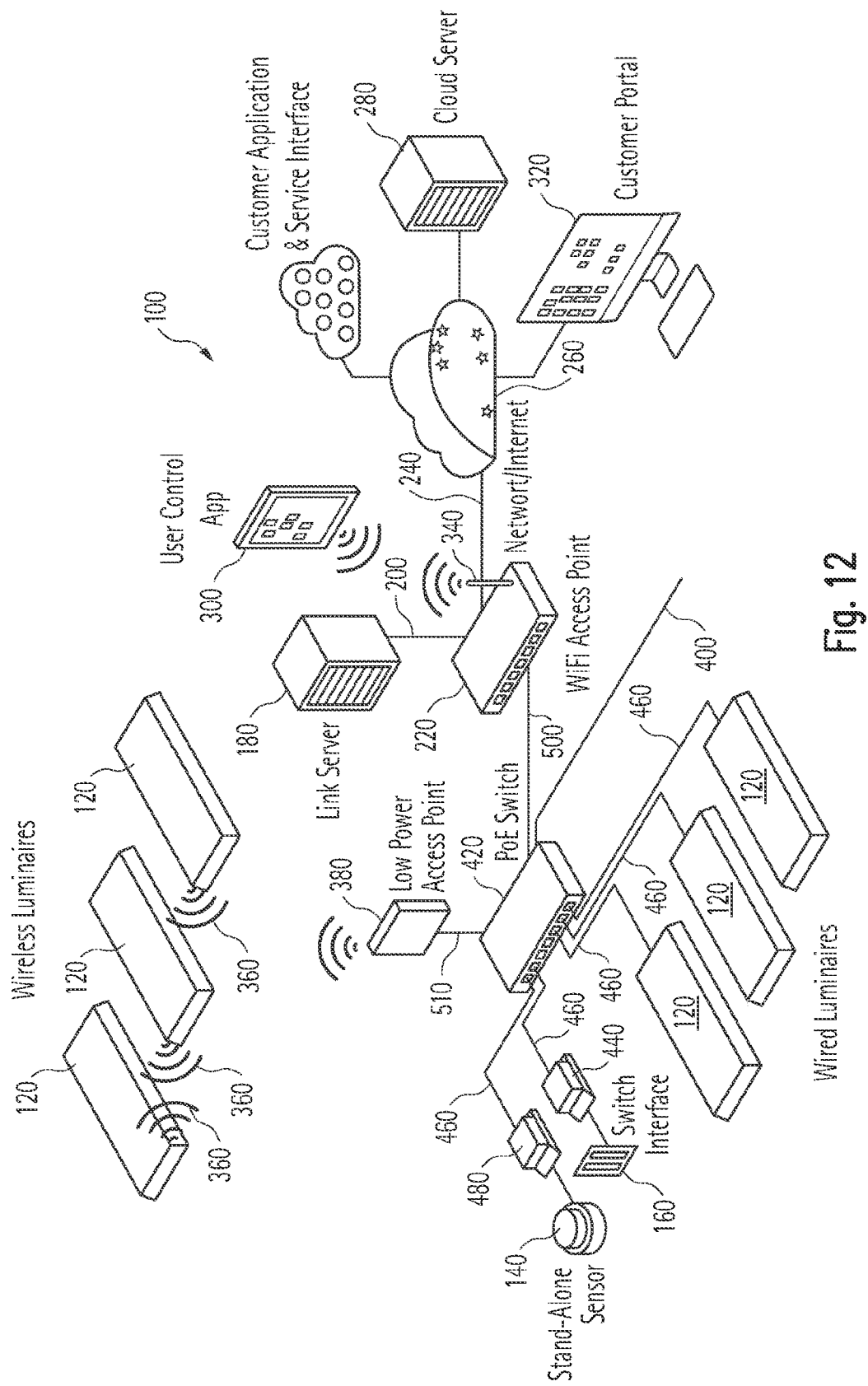
FIG. 12 shows a building technology system which can be used for the present invention.

FIG. 12 illustrates a scalable building technology system 100 with an open network architecture that is suitable for implementing the invention. Luminaire modules 120, sensors 140, actuators and room controllers 160 are connected to a local area data network.

The switched power converter system including the control unit may be part of such luminaires.

Other types of physical devices besides those listed can be incorporated into the building technology system 100 as well. By way of example, the building technology system 100 can be a Net4more® IP lighting system sold by the assignee of the present application, Tridonic GmbH & Co. The Net4more® technology is an IPv6 based network platform. Tridonic application 16159921.2 and entitled "IoT communication module for a building technology device, bus device, a building technology device for IoT-networks, building technology communication system and building technology management system" discloses many aspects of the Net4more® technology and is hereby incorporated herein by reference.

The local area network in FIG. 12 will typically include wired luminaire modules 120 but can optionally include wireless luminaire modules 120 as well. In FIG. 12, a link server 180 is connected by line 200 to a router 220 or switch part of a local area network infrastructure. The link server 180 is a gateway and termination point for a secure connection tunnel using a secure web socket to connect to a dedicated cloud server. The web socket will remain open for direct 2-way communication between a cloud server and the link server In FIG. 12, for purposes of illustration, the link server 180 and the router 220 are located at the site of the building, and the link server 220 is a gateway for the building technology system 100 from the internet 260. The invention can be implemented, however, with other computing hardware including systems that use multiple gateways, routers, switches and access points as is common in art. In accordance with the embodiment of the invention shown in FIG. 12, application software on the link server 180 manages the operation of physical devices such as luminaires 120, sensors 140 and actuators like window shade motors. The software on the link server 180 comprises, in part, a relational database and a relational database management system such as SQL from Oracle.

The calculation of the sweep patterns and/or the linearization curves/factors can be preferably done in an outsourced manner, i.e. outside the switched power converter system, by a remote computing unit such as e.g. by the link server 180 (or a cloud server 280 explained later on). The thus produced sweep patterns and/or linearization curves/factors can then be stored in a memory accessible by the switched power converter system. The memory may be a part of the luminaire module, but can also be outside the luminaire module.

FIG. 12 shows a relatively small number of luminaire modules 120 and other physical devices 140, 160 for purposes of illustration. In practice, the luminaire modules 120 and other physical devices 140, 160 shown in FIG. 12 could be representative of physical devices for a single room and an adjacent hallway in a large building. It should be understood, however, that the invention is directed to facilitating the commissioning of very large number of physical devices. A standard room on one floor of a hotel building might have nine lights, two motion sensors and three control switches, totaling fourteen network addressable physical devices for the room, and there are over twenty rooms on the floor, and hallways and waiting areas as well. A customer portal customer portal 320 provides internet access to the business technology system and software applications on the link server 180, although applications on the link server 180 could also be accessed over the local area network if desired.

As shown in FIG. 12, the Net4more® IP lighting system typically includes a cloud server 280, which in this embodiment contains commissioning software. A mobile commissioning device 300, such as a tablet, laptop or smart phone, wirelessly connected to the internet, desirably contains a software application configured to assist in identifying the location of connected physical devices on the system layout, and assist in binding the appropriate network address to the respective physical device. As discussed in more detail below, the software application on the mobile commission device 300 is also configured to provide a user interface for planning the commissioning of installed physical devices. For example, the tablet 300 can access the internet 260 and the commissioning application on the link server 280, e.g., via a WiFi access point 340 on the router 220, or via a cellular or satellite connection.

Still referring to FIG. 12, a Power over Ethernet (PoE) switch 420 receives mains power through line 400 and communicates data and provides power over lines 460 to the respective communications modules for the luminaires 120 and communications modules 440, 480 for other physical devices such as the stand-alone sensor 140 and the switch interface 160 shown in FIG. 12. The PoE switch 420 is connected via line 500 to network router 220 which, as mentioned is connected to the link server 180 and includes a WiFi access point 340 for communication with WiFi enabled devices. Alternatively to a PoE connection, the control modules for the physical devices can be connected to a standard Ethernet connection, assuming power is also supplied to the devices.

Each wireless luminaire module 120 in FIG. 12 includes a low power transceiver 360 that communicates wirelessly with a multi-channel, low power access point 380 connected to the PoE switch 420, and indirectly connected to the router 220 through line 500 and the link server 180 through line 200. Mains power is supplied to each of the wireless luminaires 120 but the architecture shown in FIG. 12 does not require for example a wired Ethernet connection to the luminaire modules 120, or a WiFi connection to the luminaire module 120. Wireless communications in this aspect of the system are preferably according to the Thread networking protocol which is an IPv6 based networking protocol for internet of things (IoT) "smart" home automation devices to communicate on a local wireless mesh network. The Thread protocol uses 6LoWPAN, which in turn typically uses IEEE 802.15.4 wireless protocol with mesh communication although the Thread protocol can operate on other radio connections including 802.11 (WiFi). The Thread protocol is IP addressable, with cloud access and AES encryption. It can support many devices in one local network mesh.

All features of all embodiments described, shown and/or claimed herein can be combined with each other.

While various embodiments of the present invention have been described above, it should be understood that they have been presented by way of example only and not limitation. Numerous changes to the disclosed embodiments can be made in accordance with the disclosure herein without departing from the spirit of scope of the invention. Thus, the breadth and scope of the present invention should not be limited by any of the above-described embodiments. Rather, the scope of the invention should be defined in accordance with the following claims and their equivalence.

Although the invention has been illustrated and described with respect to one or more implementations, equivalent alternations and modifications will occur to those skilled in the art upon the reading of the understanding of the specification and the annexed drawings. In addition, while a particular feature of the invention may have been disclosed with respect to only of the several implementations, such features may be combined with one or more other features of the other implementations as may be desired and advantage for any given or particular application. In the foregoing description, certain terms have been used for brevity, clarity, and understanding. No unnecessary limitations are to be inferred therefrom beyond the requirement of the prior art because such terms are used for descriptive purposes and are intended to be broadly construed. The different configurations, systems, and method steps described herein may be used alone or in combination with other configurations, systems and method steps. It is to be expected that various equivalents, alternatives and modifications are possible within the scope of the appended claims. Each limitation in the appended claims is intended to invoke interpretation under 35 U.S.C. § 112, sixth paragraph, only if the terms "means for" or "step for" are explicitly recited in the respective limitation.

What is claimed is:

1. A networked lighting system comprising a local area network; at least one luminaire module having an LED load connected to the local area network; a switched power converter system (102) having a first computing unit; and a second computing unit outside the switched power converter system; wherein:
    the switched power converter system (102) is arranged for supplying the LED load with a feedback controlled current, the switched power converter system comprising:
    a power converter (102d) with at least one switch (Q1, Q2) controlled by a first control unit (106) of the power converter, wherein the first control unit (106) comprises a feedback controller generating a switch control signal based on a feedback signal (Imeas) representing the load current (ILED), the switch control signal for controlling a period or a frequency of a switching operation of the at least one switch, and
    a sweep block for modulating the switch control signal (tout-ctrl) by a cyclic sweep pattern, wherein the modulated switch control signal (tout-sweep) is provided directly or indirectly to the at least one switch (Q1, Q2); and
    the cyclic sweep pattern is produced in an outsourced manner by the second computing unit outside the switched power converter system and then stored in a memory accessible by the sweep block.

2. The networked lighting system of claim 1, wherein the second computing unit outside of the switched power converter system is a network link server or a cloud server.

3. The networked lighting system of claim 1, wherein the switched power converter system comprises a linearization unit supplied with a signal representing the load voltage, and calibrating the control signal supplied to the at least one switch with a linearization factor at least partially compensating for the nonlinear load current/frequency behavior of the power converter (102d).

4. The networked lighting system of claim 1, wherein the switched power converter system comprises a linearization unit supplied with a signal representing the load voltage, and calibrating cyclic sweep amplitude with a linearization factor at least partially compensating for the nonlinear load current/frequency behavior of the power converter (102d).

5. The networked lighting system of claim 4, wherein the linearization factor is produced in an outsourced manner by the second computing unit outside the switched power converter system and then stored in the memory accessible by the linearization unit.

6. The networked lighting system of claim 1, wherein the switched power converter (102) has a boost topology, a buck topology (300) or a flyback topology.

7. The networked lighting system of claim 1, wherein the switched power converter (102d) is a switched resonant converter.

8. The networked lighting system of claim 1, wherein the switched power converter (102) comprises one or more stages.

9. The lighting system of claim 1, wherein the second computing unit applies Artificial Intelligence to produce the cyclic sweep pattern.

* * * * *